(12) United States Patent
Hattori (10) Patent No.: US 7,375,749 B2
(45) Date of Patent: May 20, 2008

(54) METHOD OF CORRECTING PIXEL DEFECT IN IMAGE SENSING ELEMENT, AND IMAGE SENSING APPARATUS USING THE SAME

(75) Inventor: Yuuichirou Hattori, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 664 days.

(21) Appl. No.: 10/913,853

(22) Filed: Aug. 6, 2004

(65) Prior Publication Data
US 2005/0030395 A1    Feb. 10, 2005

(30) Foreign Application Priority Data
Aug. 8, 2003    (JP)    ............................... 2003-290167

(51) Int. Cl.
*H04N 9/64*    (2006.01)
(52) U.S. Cl. ...................................... 348/246; 348/246
(58) Field of Classification Search ................ 348/246, 348/247
See application file for complete search history.

(56) References Cited

U.S. PATENT DOCUMENTS

| | | | | |
|---|---|---|---|---|
| 5,416,516 A * | 5/1995 | Kameyama et al. | ......... | 348/246 |
| 5,805,216 A * | 9/1998 | Tabei et al. | .................. | 348/246 |
| 6,683,643 B1 * | 1/2004 | Takayama et al. | ........... | 348/247 |
| 7,263,215 B2 * | 8/2007 | Nishio et al. | ................ | 382/149 |

FOREIGN PATENT DOCUMENTS

| | | |
|---|---|---|
| JP | 06-022227 | 1/1994 |
| JP | 06-030425 | 2/1994 |
| JP | 06-245148 | 9/1994 |
| JP | 07-023297 | 1/1995 |
| JP | 09-113574 | 5/1997 |
| JP | 11-239298 | 8/1999 |
| JP | 2003-046871 | 2/2003 |
| JP | 2003-111088 | 4/2003 |

* cited by examiner

*Primary Examiner*—Jingge Wu
*Assistant Examiner*—Jayesh A Patel
(74) *Attorney, Agent, or Firm*—Morgan & Finnegan, LLP

(57) ABSTRACT

An image sensing apparatus includes a solid-state image sensing element having a plurality of pixels which output image sensing signals, a first determination device which determines whether a pixel of interest is a defective pixel candidate, by comparing the signal level of the pixel of interest subjected to defective pixel detection out of the plurality of pixels of the solid-state image sensing element, and the signal levels of a plurality of peripheral pixels around the pixel of interest, and a second determination device which, when the first determination device determines that the pixel of interest is the defective pixel candidate, determines whether the determination result representing that the pixel of interest is the defective pixel candidate is erroneous detection, on the basis of the determination result of the first determination device representing whether a plurality of peripheral pixels around the pixel of interest are defective pixel candidates.

7 Claims, 11 Drawing Sheets

| | | | |
|---|---|---|---|
| G | R | G | R |
| B | G | B | G |
| G | R | G | R |
| B | G | B | G |

FIG. 4

PIXEL OF INTEREST

| D1 | D2 | D3 |
|----|----|----|
| D4 | D5 | D6 |
| D7 | D8 | D9 |

METHOD OF CORRECTING PIXEL DEFECT IN IMAGE SENSING ELEMENT, AND IMAGE SENSING APPARATUS USING THE SAME

CLAIM TO PRIORITY

This application claims priority from Japanese Patent Application No. 2003-290167 filed on Aug. 8, 2003, which is hereby incorporated by reference herein.

FIELD OF THE INVENTION

The present invention relates to an image sensing apparatus having an image sensing element and, more particularly, to an image sensing apparatus and image sensing method capable of correcting a pixel defect in an image sensing element during image sensing.

BACKGROUND OF THE INVENTION

A conventional solid-state image sensing element such as a CCD (Charge Coupled Device) suffers a so-called defective pixel in which the sensitivity is lower than that of a nondefective pixel or a very large dark current flows. Such defective pixel appears as isolated point noise in an image sensed by the solid-state image sensing element, degrading the image quality. In order to eliminate an adverse effect on the image quality, an image sensing apparatus using the solid-state image sensing element corrects a defective pixel.

As conventional defective pixel correction methods, the following two methods have generally been known.

According to the first correction method, the position of a defective pixel is detected in shipping an image sensing apparatus from the factory. The information is stored in a nonvolatile memory such as an EEPROM (Electrically Erasable and Programmable Read Only Memory) incorporated in the image sensing apparatus. The defective pixel is corrected by replacing it with a pixel interpolated by peripheral pixels on the basis of the information during image sensing operation.

According to the second method, a pixel having an abnormal output is detected as a defective pixel on the basis of the signal level difference between adjacent pixels during image sensing operation. The defective pixel is replaced with a pixel interpolated by peripheral pixels. As a concrete example of the second method, Japanese Patent Laid-Open No. 11-239298 discloses an electronic camera capable of properly correcting white scratches which increase/decrease in accordance with the exposure time.

The first correction method achieves a high detection precision because stable image sensing conditions can be set in detecting a defective pixel. However, this method requires a nonvolatile memory for storing pieces of position information corresponding to the number of assumed defective pixels. This results in high cost and high power consumption.

The second correction method does not require any nonvolatile memory for storing position information of a defective pixel. However, if a defective pixel is detected while an image such as a natural image (image with a complicated brightness difference or color saturation difference) is sensed, the defective pixel detection precision decreases, and the image quality degrades due to correction based on erroneous detection.

SUMMARY OF THE INVENTION

The present invention has been made in consideration of the above situation, and has as its object to provide an image sensing apparatus and image sensing method capable of eliminating a nonvolatile memory for storing position information of a defective pixel, and detecting a defective pixel at high precision even while sensing a complicated object.

The present invention has been made to overcome the conventional drawbacks. According to the first aspect of the present invention, there is provided an image sensing apparatus comprising a solid-state image sensing element having a plurality of pixels which output image sensing signals, a first determination device which determines whether a pixel of interest is a defective pixel candidate, by comparing a signal level of the pixel of interest subjected to defective pixel detection out of the plurality of pixels of the solid-state image sensing element, and, signal levels of a plurality of peripheral pixels around the pixel of interest, and a second determination device which, when the first determination device determines that the pixel of interest is the defective pixel candidate, determines whether a determination result representing that the pixel of interest is the defective pixel candidate is erroneous detection, on the basis of a determination result of the first determination device representing whether a plurality of peripheral pixels around the pixel of interest are defective pixel candidates.

According to the second aspect of the present invention, there is provided an image sensing method for an image sensing apparatus having a solid-state image sensing element with a plurality of pixels which output image sensing signals, comprising a first determination step of determining whether a pixel of interest is a defective pixel candidate, by comparing a signal level of the pixel of interest subjected to defective pixel detection out of the plurality of pixels of the solid-state image sensing element, and signal levels of a plurality of peripheral pixels around the pixel of interest, and a second determination step of, when the pixel of interest is determined in the first determination step to be the defective pixel candidate, determining whether a determination result representing that the pixel of interest is the defective pixel candidate is erroneous detection, on the basis of a determination result of the first determination step representing whether a plurality of peripheral pixels around the pixel of interest are defective pixel candidates.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described below.

First Embodiment

Figure 1:
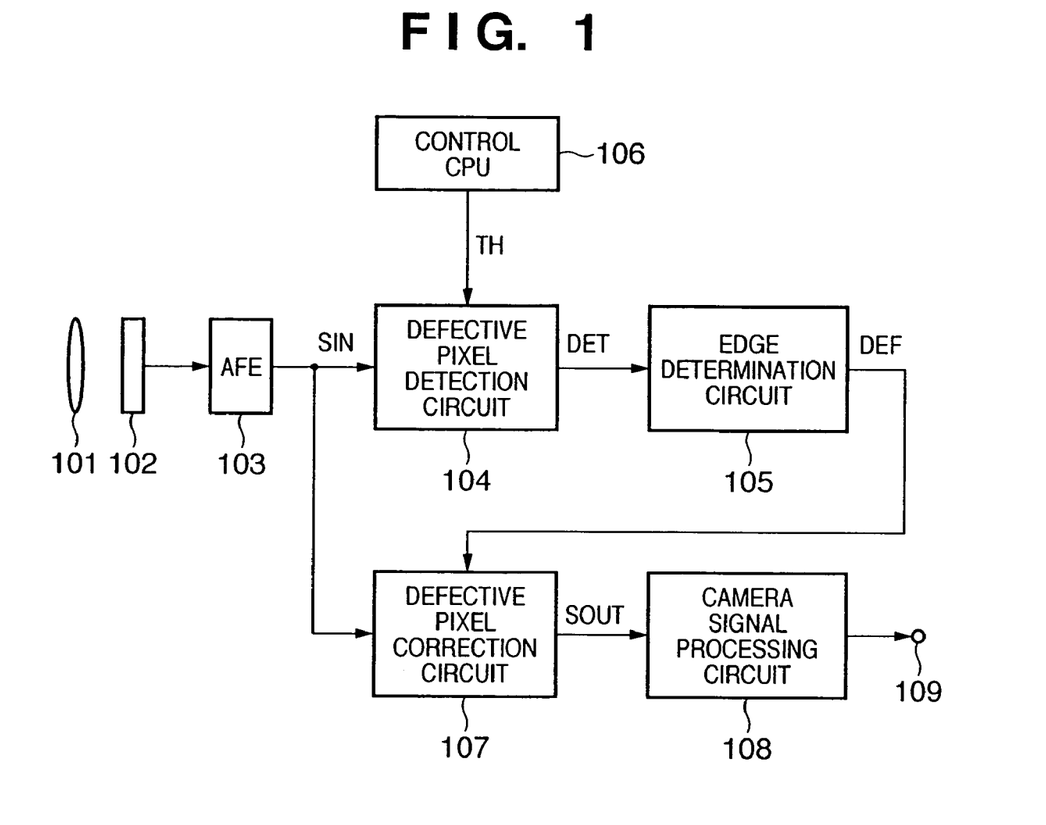
FIG. 1 is a block diagram showing the schematic arrangement of a single-CCD image sensing apparatus according to the first embodiment of the present invention.
Figure 3:
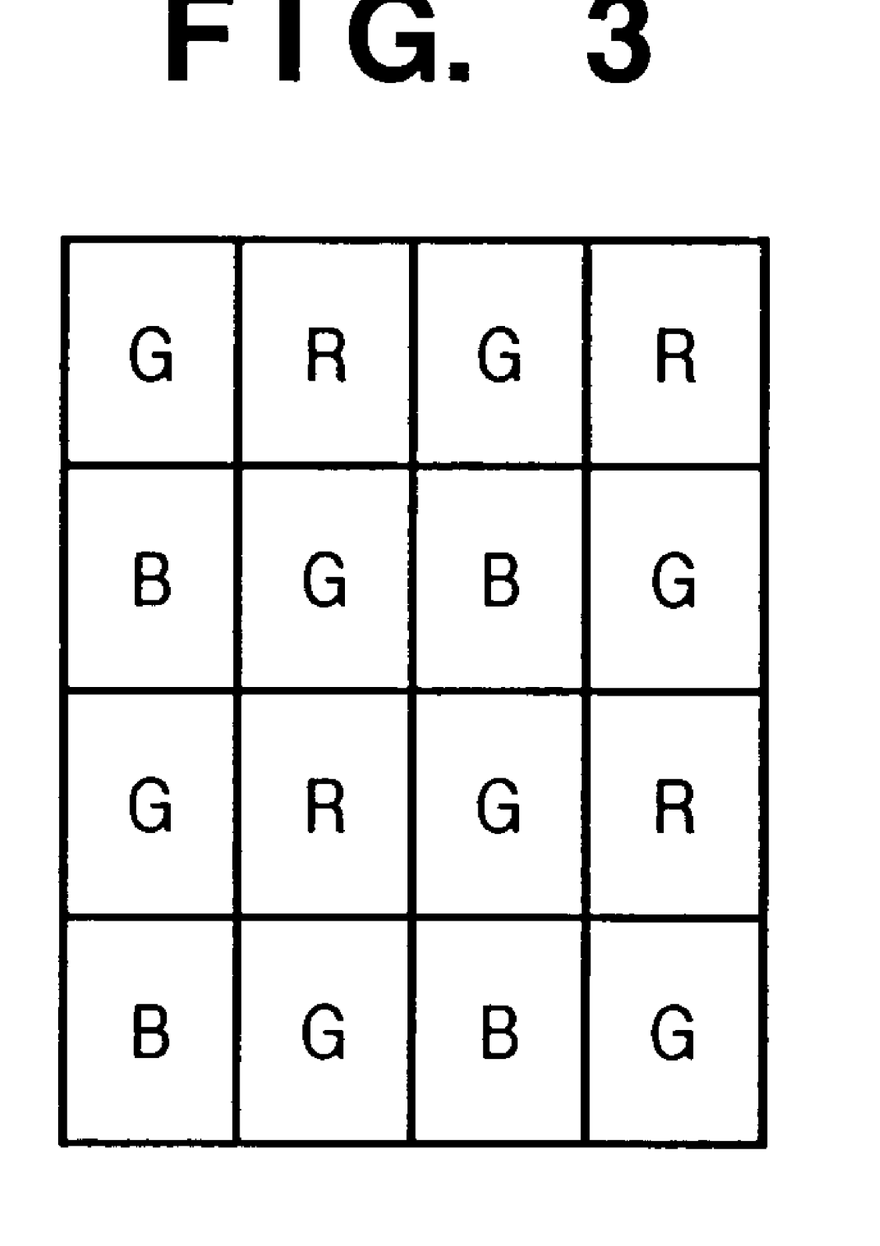
FIG. 3 is a view showing an example of the array of color filters on an image sensing element 102.

FIG. 1 is a block diagram showing the schematic arrangement of a single-CCD image sensing apparatus according to the first embodiment of the present invention. In FIG. 1, incident light traveling from an object to be sensed is formed on the image sensing plane of an image sensing element 102 via an imaging optical system (image sensing lens or the like) 101. The pixels of the image sensing element 102 are covered with a color filter for color image sensing. The image sensing element 102 is, e.g., a CCD, and the pixels of the image sensing element 102 perform photoelectric conversion in accordance with the object brightness. In the first embodiment, the color filter is prepared by periodically arraying color filters of three colors R, G, and B (Red, Green, and Blue), as shown in FIG. 3. The color filter array is not limited to this, and various arrays with combinations of various colors such as a combination of only complementary colors and a combination of complementary colors and primary colors can be preferably employed.

The image sensing element 102 is controlled to drive by a timing generation circuit and driving circuit (neither is shown), and outputs an image sensing signal corresponding to the object brightness. The image sensing signal output from the image sensing element 102 undergoes an analog signal process and A/D (Analog-to-Digital) conversion by an AFE (Analog Front End) circuit 103, and is output as image sensing data SIN. The image sensing data SIN output from the AFE circuit 103 is supplied to a defective pixel detection circuit 104 and defective pixel correction circuit 107.

The defective pixel detection circuit 104 detects a defective pixel from the image sensing data SIN during image sensing operation, and outputs a detection signal DET. The arrangement and operation of the defective pixel detection circuit 104 will be described in detail later. A control CPU 106 supplies to the defective pixel detection circuit 104 a threshold TH for detecting a defective pixel. The detection signal DET output from the defective pixel detection circuit 104 is supplied to an edge determination circuit 105. The edge determination circuit 105 determines whether the detection signal DET represents detection of a defective pixel, from the two-dimensional distribution of the supplied detection signal DET. The edge determination circuit 105 then outputs a determination signal DEF. The edge determination circuit 105 prevents erroneous detection of an image edge as a defective pixel, and prevents degradation of the image quality by erroneous defective pixel correction. The arrangement and operation of the edge determination circuit 105 will be described in detail later.

The defective pixel correction circuit 107 executes a defective pixel correction process for a defective pixel which is determined from the determination signal DEF output from the edge determination circuit 105. The defective pixel correction circuit 107 outputs corrected image sensing data SOUT. More specifically, the defective pixel correction circuit 107 corrects a defective pixel by calculating the average of pixels around the defective pixel and replacing the pixel value of the defective pixel with the average. The defective pixel-corrected image sensing data SOUT undergoes various signal processes such as edge correction, color correction, and $\gamma$ correction by a camera signal processing circuit 108, and is output as an image signal from a terminal 109. With the above arrangement, the image sensing apparatus according to the first embodiment can detect a defective pixel at high precision and correct the detected defective pixel while preventing erroneous detection during image sensing operation.

Figure 2:
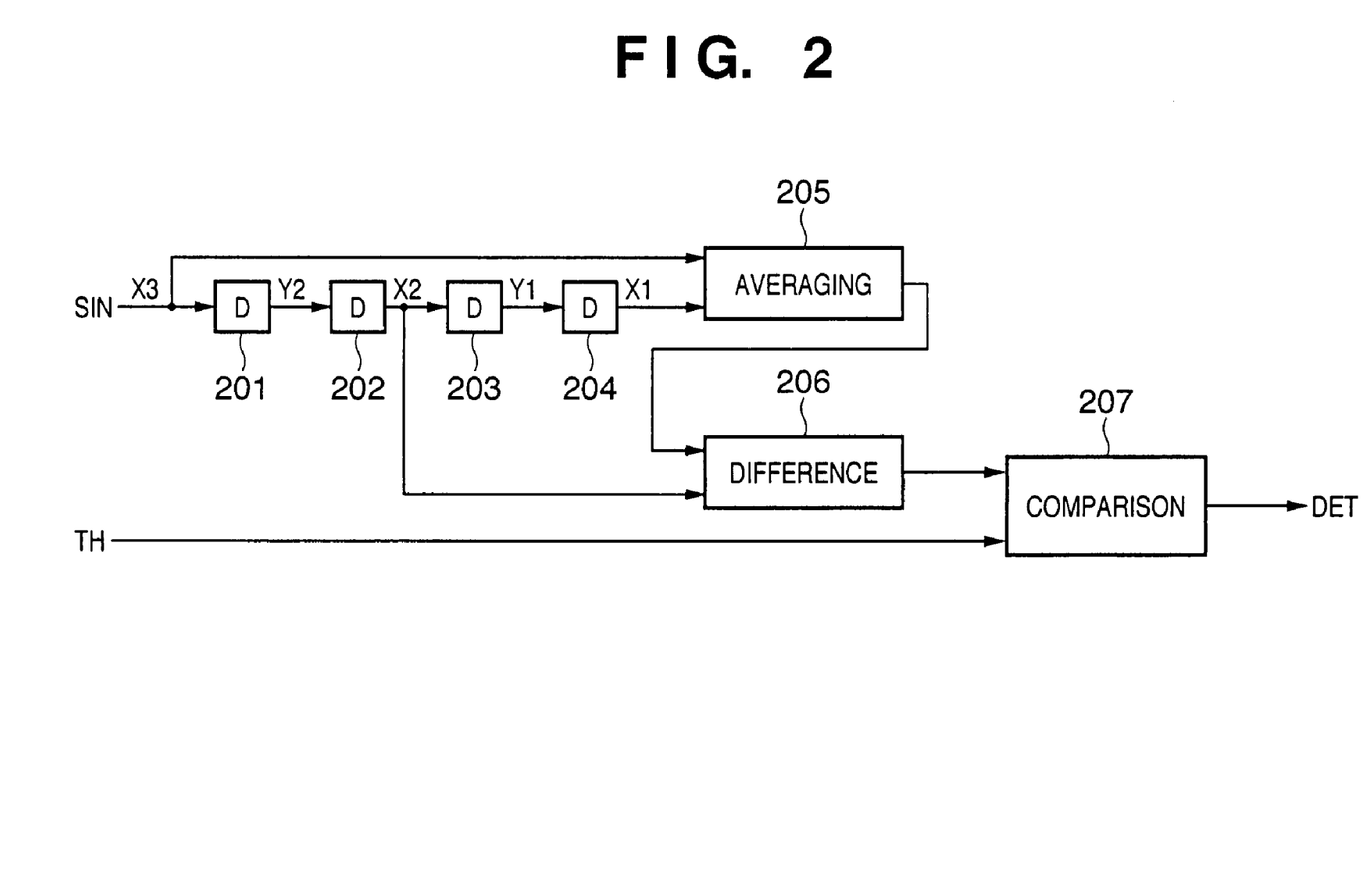
FIG. 2 is a block diagram showing an example of the arrangement of a defective pixel detection circuit 104 shown in FIG. 1.
Figure 4:
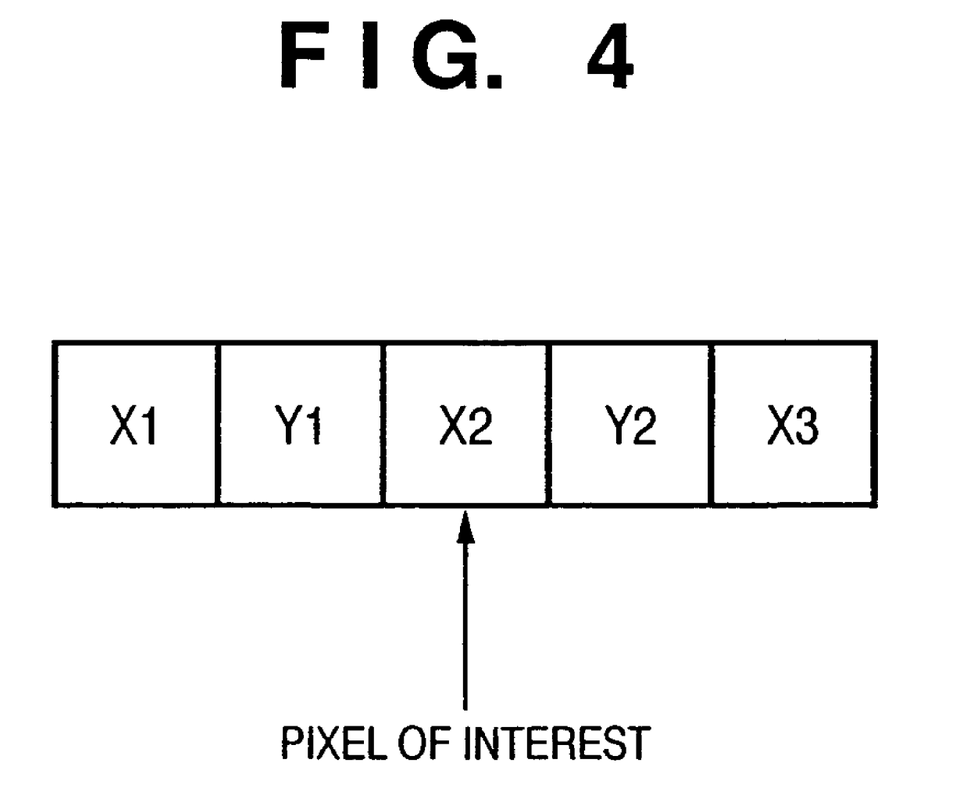
FIG. 4 is a view showing the two-dimensional array image of pixel data shown in FIG. 2 on the image sensing element 102.

An example of the arrangement of the defective pixel detection circuit 104 will be explained with reference to FIG. 2. FIG. 2 is a block diagram showing an example of the arrangement of the defective pixel detection circuit 104 shown in FIG. 1. In FIG. 2, reference numerals 201 to 204 denote 1-pixel delay devices each of which delays one pixel of the input image sensing data SIN. As shown in FIG. 2, pixel data input/output to/from the 1-pixel delay devices 201 to 204 are defined as X3, Y2, X2, Y1, and X1. The pixels of the image sensing element 102 are covered with color filters of two colors alternately in the horizontal scanning direction, as shown in FIG. 3. For this reason, pixel data (X1, X2, and X3) and pixel data (Y1 and Y2) are pixel data of filters of the same colors. FIG. 4 shows the two-dimensional array image of the pixel data shown in FIG. 2 on the image sensing element 102. Assuming that the pixel data X2 is obtained from a pixel of interest subjected to defect detection, as shown in FIG. 4, the pixel data X1 and X3 preceding and succeeding to the pixel of interest in the 1-pixel delay devices 201 to 204 are obtained from pixels which are arrayed left and right to the pixel of interest on the image sensing element 102 and covered with filters of the same color.

More specifically, the 1-pixel delay devices 201 to 204 synchronize the pixel data X2 of interest subjected to defective pixel detection and the left and right pixel data X1 and X3 of the same color. Of the three synchronized pixel data, X1 and X3 are supplied to an averaging circuit 205 where the average of the two pixel data is calculated. The average and pixel data X2 are supplied to a difference calculation circuit 206 where an absolute difference value is calculated as the absolute value of the difference between the average and the pixel data X2.

The absolute difference value calculated by the difference calculation circuit 206 is supplied to a comparison circuit 207 where the absolute difference value is compared with the threshold TH. The detection signal DET as an output signal from the comparison circuit 207 becomes true when the absolute difference value is larger than the threshold TH, and false when the absolute difference value is equal to or smaller than the threshold TH. In this manner, the defective pixel detection circuit 104 detects a defective pixel present as a singular point by comparing a pixel of interest and the average of two, right and left pixels having filters of the same color. By using above method the defective pixel detection circuit 104 performs detection operation, which detects whether a pixel of interest is a defective pixel candidate or not, for all pixels while changing the pixel of interest, and outputs a detection signal DET. The method of detecting a defective pixel as a singular point is not limited to the above-described one, and various detection methods can be preferably utilized in accordance with the color filter array or the like.

Figure 5:
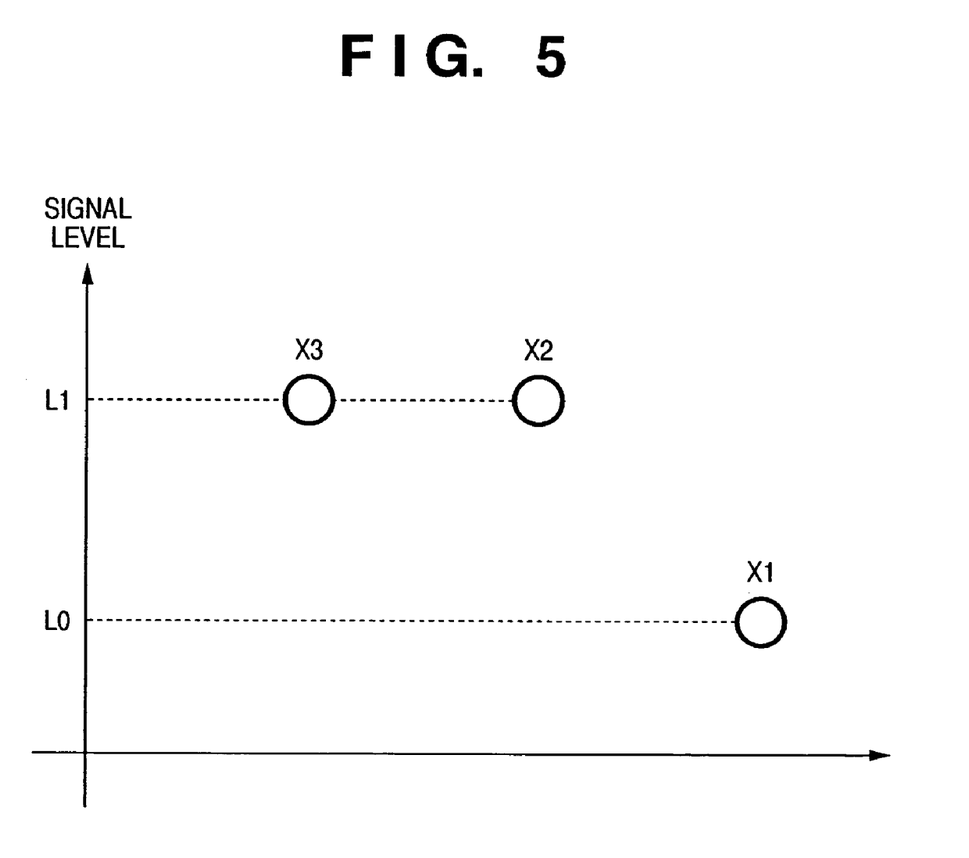
FIG. 5 is a graph showing an example of a brightness change at an edge erroneously detected as a defective pixel.

The above-described detection method detects a singular point as a defective pixel, but also erroneously detects as a defective pixel an edge (abrupt brightness change) contained in a sensed image. An example of a brightness change at an edge erroneously detected as a defective pixel will be explained with reference to FIG. 5. FIG. 5 is a graph showing an example of a brightness change at an edge erroneously detected as a defective pixel. L1 represents the signal level of X2 and X3, and L0 represents that of X1. FIG. 5 illustrates a case in which the pixel X1 and the pixel X2 of interest abruptly change in brightness and the pixel X2 of interest exists on the edge. In this case, the defective pixel detection circuit 104 performs erroneous detection and the detection signal DET becomes true when the change of the signal level is larger than the threshold TH, like inequality (1):

$$|L1-(L0+L1)/2|>TH \qquad (1)$$

When the pixel X2 of interest exists on the edge and the detection signal DET is input to the defective pixel correction circuit 107, the pixel X2 of interest is corrected as a defective pixel, degrading the image quality. From this, the first embodiment supplies the detection signal DET to the edge determination circuit 105 in order to discriminate a defective pixel from an edge. When the pixel is determined not to exist on the edge, the determination signal DEF is output as "true".

An example of the circuit arrangement of the edge determination circuit 105 shown in FIG. 1 will be explained.

Figure 6:
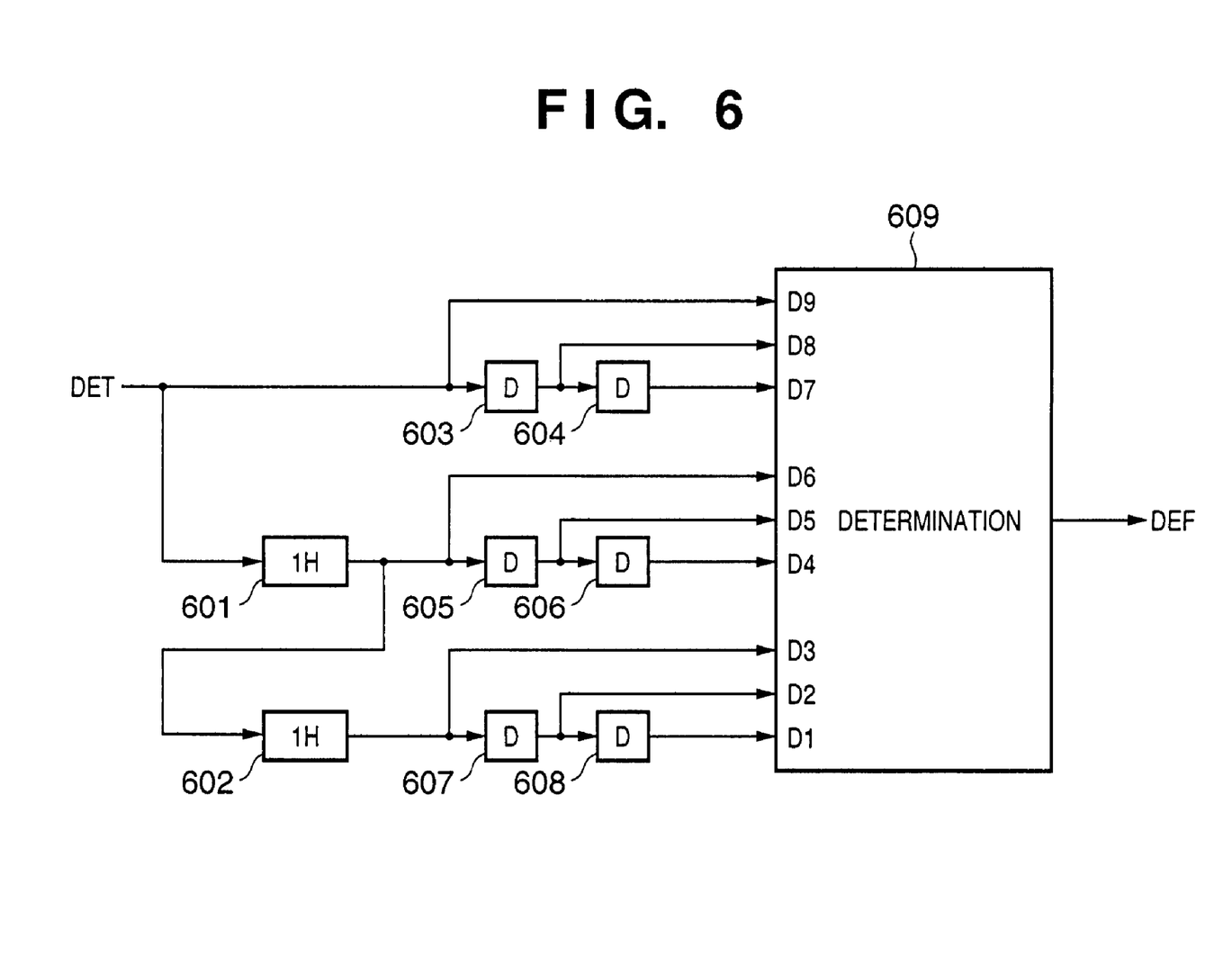
FIG. 6 is a circuit diagram showing an example of the circuit arrangement of an edge determination circuit 105 shown in FIG. 1.

FIG. 6 is a circuit diagram showing an example of the circuit arrangement of the edge determination circuit 105 shown in FIG. 1. As shown in FIG. 6, the edge determination circuit 105 is comprised of 1-line delay devices 601 and 602 each of which delays one horizontal line of the image sensing element 102, 1-pixel delay devices 603 to 608, and an edge determination unit 609. The detection signal DET input from the defective pixel detection circuit 104 is input to the input terminal of the 1-line delay device 601, that of the 1-pixel delay device 603, and an input terminal D9 of the edge determination unit 609. The output terminal of the 1-pixel delay device 603 is connected to an input terminal D8 of the edge determination unit 609 and the input terminal of the 1-pixel delay device 604. The output of the 1-line delay device 601 is connected to the 1-pixel delay device 605, an input terminal D6 of the edge determination unit 609, and the input terminal of the 1-line delay device 602.

The output of the 1-pixel delay device 605 is connected to the input terminal of the 1-pixel delay device 606 and an input terminal D5 of the edge determination unit 609. The outputs of the 1-pixel delay devices 604, 606, and 608 are respectively connected to input terminals D7, D4, and D1 of the edge determination unit 609. The output of the 1-line delay device 602 is connected to an input terminal D3 of the edge determination unit 609 and the input terminal of the 1-pixel delay device 607.

Figure 7:
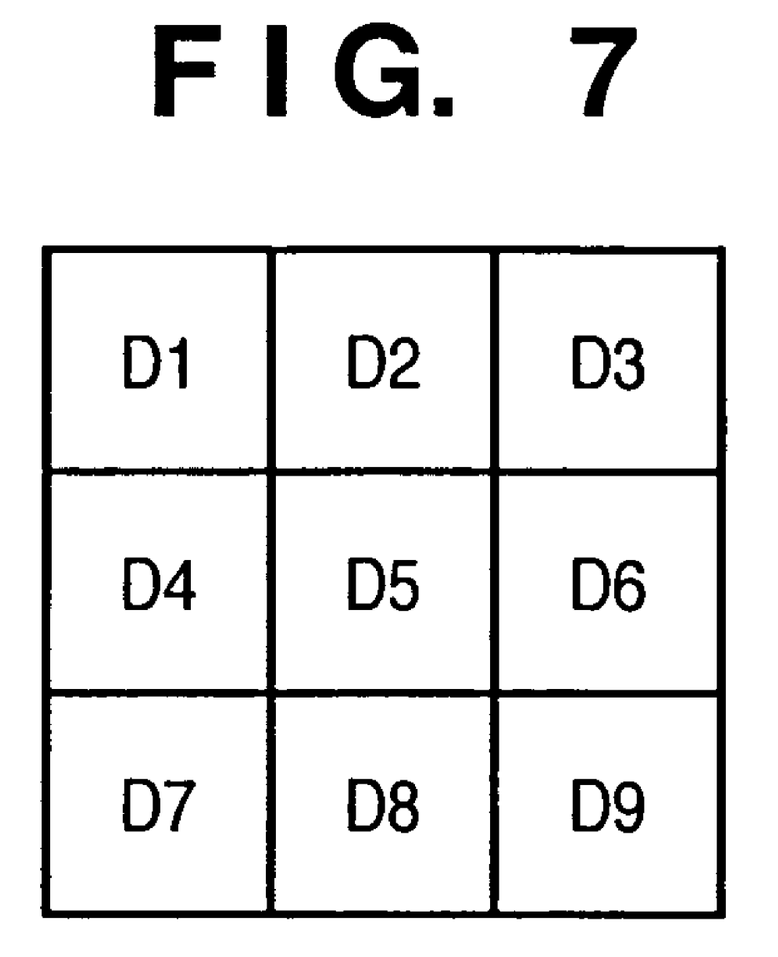
FIG. 7 is a view showing the pixel array, on the image sensing element 102, of a pixel of interest and peripheral pixels used for edge determination by the edge determination circuit 105.

The detection signals DET corresponding to pixel data D1 to D9 having a 3×3 pixel array on the image sensing element 102 shown in FIG. 7 are synchronized by the arrangement of the 1-line delay devices 601 and 602 and the 1-pixel delay devices 603 to 608, and input to the input terminals D1 to D9 of the edge determination unit 609. When the detection signal DET is true for one of eight pixels of pixel data D1, D2, D3, D4, D6, D7, D8, and D9 adjacent to pixel data D5 of a pixel of interest subjected to edge determination in FIG. 7, the edge determination unit 609 determines that the pixel of the pixel data D5 is not a defective pixel but exists on the edge, and the determination signal DEF becomes false. When the detection signal DET is false for all the eight pixels, the pixel of the pixel data D5 is more likely to be an isolated point, and the determination signal DEF becomes true. That is, when the detection signals DET two-dimensionally successively become true on the assumption that the brightness difference two-dimensionally continues at the edge, the edge is decided to have erroneously been detected. As described above, the edge determination circuit 105 determines whether an edge has erroneously been detected, by two-dimensionally deciding the detection state of the detection signal DET obtained when the defective pixel detection circuit 104 detects a pixel as a defective one. The edge determination circuit 105 outputs the determination signal DEF representing that the detection signal DET is one containing no erroneous edge detection.

As described above, the information required for determining whether a pixel of interest is an edge or a defective pixel can be reduced, because the edge determination circuit 105 performs the determination operation whether the pixel of interest is the edge or the defective pixel by using the detection signal DET. Further, a circuit size and a processing time can be reduced compared with conventional defective pixel correction processing, because the processing of this embodiment is not complicated.

An example of the circuit arrangement of the defective pixel correction circuit 107 shown in FIG. 1 will be explained.

Figure 8:
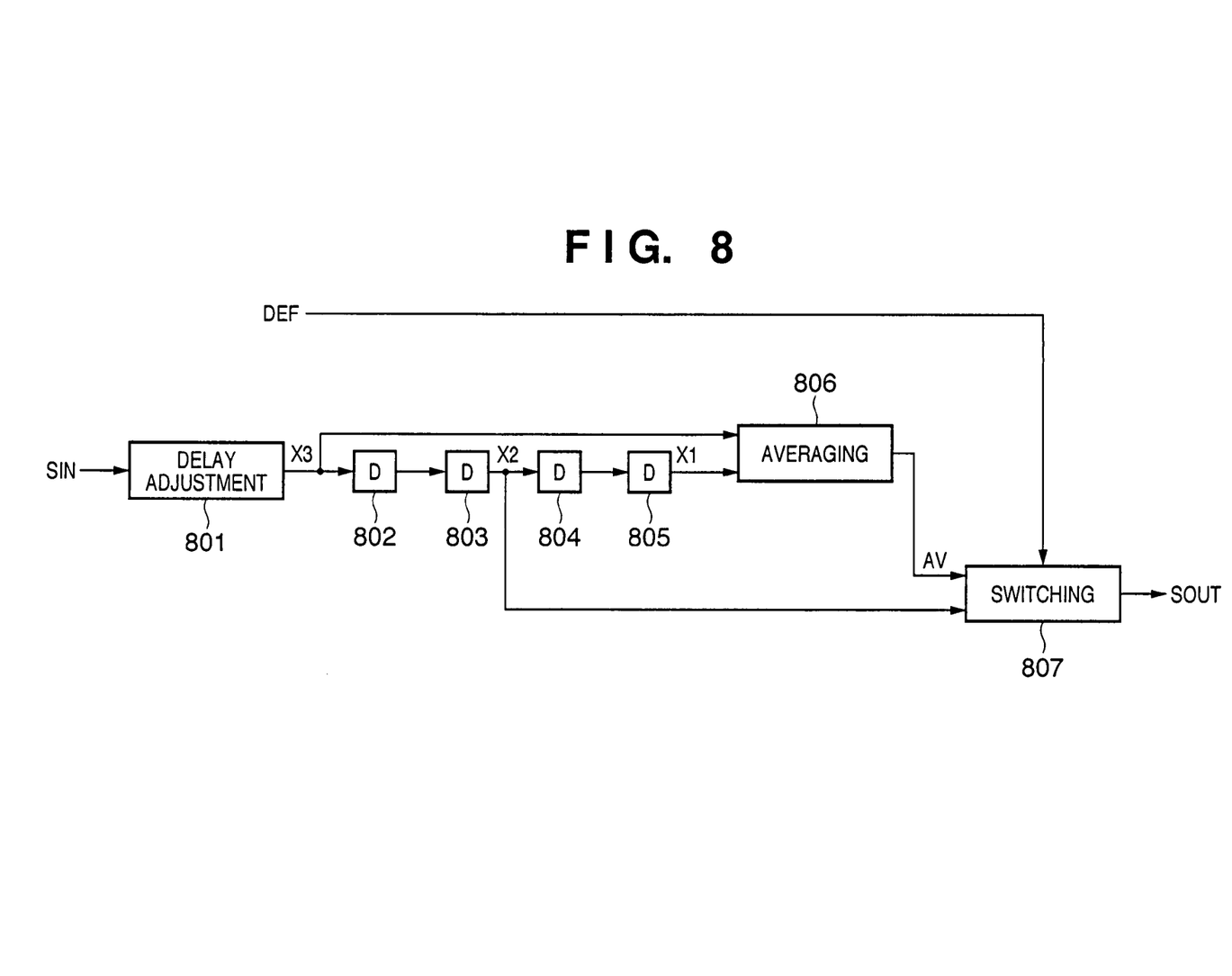
FIG. 8 is a block diagram showing an example of the circuit arrangement of a defective pixel correction circuit 107 shown in FIG. 1.

FIG. 8 is a block diagram showing an example of the circuit arrangement of the defective pixel correction circuit 107 shown in FIG. 1. In FIG. 8, a delay adjustment circuit 801 delays and adjusts the image sensing data SIN supplied from the AFE circuit 103 so that a pixel of interest subjected to defective pixel correction and the determination signal DEF output from the edge determination circuit 105 are phase-locked. One-pixel delay devices 802 to 805 synchronize three adjacent pixels (X1, X2, and X3) covered with filters of the same color from the delayed/adjusted image sensing data. An averaging circuit 806 calculates an average AV of the pixel data X1 and X3. At the same time, a switching circuit 807 outputs the average AV as corrected image sensing data SOUT on the basis of the determination signal DEF when the pixel X2 of interest is a defective pixel, and the pixel signal X2 as image sensing data SOUT when the pixel X2 of interest is a nondefective pixel.

The defective pixel correction circuit 107 corrects a defective pixel in accordance with the determination signal DEF which is output from the edge determination circuit 105 and serves as a defective pixel detection signal containing no erroneous edge detection. The first embodiment obtains correction data by averaging data of two pixels preceding and succeeding to a defective pixel. However, the present invention is not limited to this, and correction data can be preferably obtained by arbitrary calculation using arbitrary peripheral pixel data in accordance with the color filter array or the like.

As described above, the image sensing apparatus according to the first embodiment can prevent erroneous detection of an image edge as a defective pixel and implement high-precision detection of a defective pixel when a defective pixel is detected using image sensing data. This can prevent degradation of the image quality caused by correction based on a detection signal obtained by erroneously detecting a defective pixel. The cost can be reduced because no nonvolatile memory is required, unlike a conventional apparatus which stores defective pixel information in a nonvolatile memory in advance. The method of storing defective pixel information in a nonvolatile memory cannot cope with a new defective pixel due to deterioration over time, a phenomenon in which the number of defective pixels increases/decreases in accordance with the exposure time on a solid-state image sensing element, or an increase in defective pixels depending on the use environment (particularly the temperature). To the contrary, the image sensing apparatus according to the first embodiment can satisfactorily cope with these situations.

Second Embodiment

Figure 9:
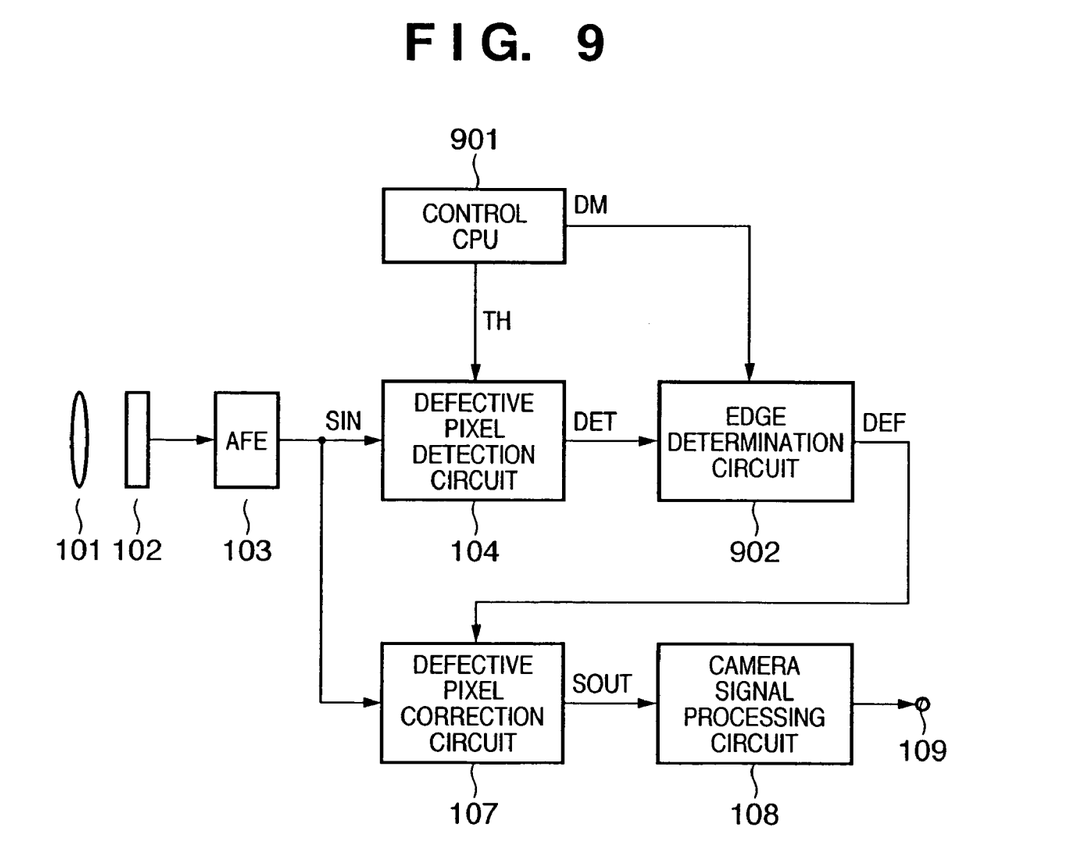
FIG. 9 is a block diagram showing the schematic arrangement of an image sensing apparatus according to the second embodiment.

An image sensing apparatus according to the second embodiment that is different in an edge determination process from the image sensing apparatus according to the first embodiment will be described. FIG. 9 is a block diagram showing the schematic arrangement of an image sensing apparatus according to the second embodiment. In FIG. 9, the same reference numerals as 101, 102, 103, 104, 107, 108, and 109 in FIG. 1 denote parts having the same functions, and a description thereof will be omitted. In other words, the image sensing apparatus according to the second embodiment is different from the image sensing apparatus according to the first embodiment in that a control CPU 901 and edge determination circuit 902 are arranged.

As shown in FIG. 9, the control CPU 901 is the same as the control CPU 106 according to the first embodiment in that the control CPU 901 outputs the above-mentioned threshold TH, but different in that the control CPU 901 further outputs to the edge determination circuit 902 a determination mode control signal DM for controlling an edge determination process. The edge determination circuit 902 switches the edge determination process mode on the basis of the determination mode control signal DM supplied from the control CPU 901, and determines whether the detection signal DET is obtained by erroneous edge detection.

An example of the circuit arrangement of the edge determination circuit 902 shown in FIG. 9 will be explained.

Figure 10:
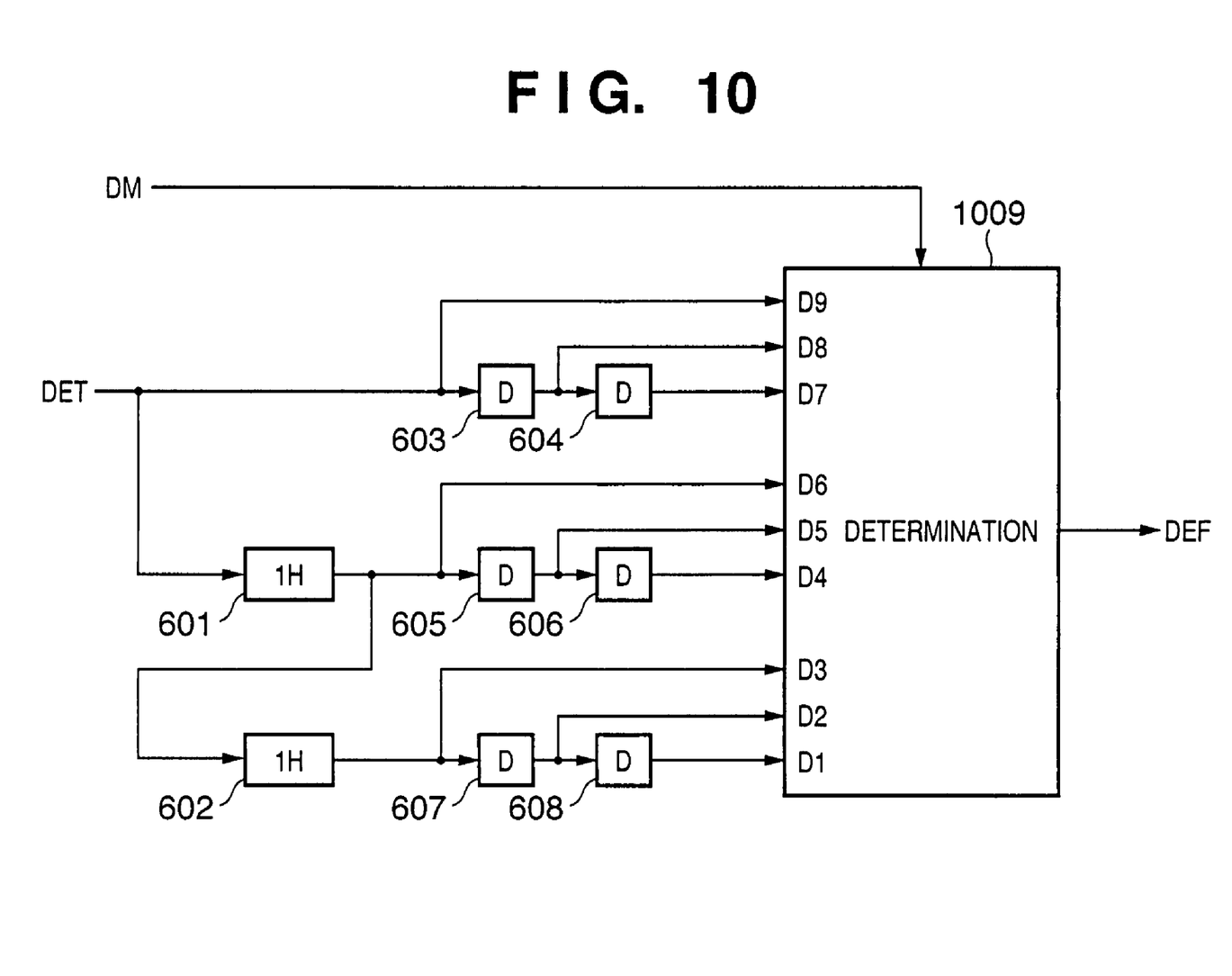
FIG. 10 is a circuit diagram showing an example of the circuit arrangement of an edge determination circuit 902 shown in FIG. 9.

FIG. 10 is a circuit diagram showing an example of the circuit arrangement of the edge determination circuit 902 shown in FIG. 9. In FIG. 10, the same reference numerals as 601 to 608 in FIG. 6 denote parts having the same functions, and a description thereof will be omitted. The edge determination circuit 902 shown in FIG. 10 is different from the edge determination circuit 105 shown in FIG. 1 in that an edge determination unit 1009 is arranged.

The edge determination unit 1009 has a plurality of process modes in accordance with peripheral pixel reference methods in edge determination. Selection of the process mode is controlled by the determination mode control signal DM. A concrete example of controlling the peripheral pixel reference method in accordance with the determination mode control signal DM will be explained with reference to FIGS. 11A to 11D. FIGS. 11A to 11D are views showing a concrete example of controlling the peripheral pixel reference method in accordance with the determination mode control signal DM in the edge determination circuit 1009. As shown in FIGS. 11A to 11D, the edge determination circuit 1009 selects and executes one of four peripheral pixel reference methods (to be referred to as reference methods a to d hereinafter) in accordance with the determination mode control signal DM. The determination mode control signal DM supplied from the control CPU 901 is a signal which designates one of the reference methods a to d. In the second embodiment, reference methods shown in FIGS. 11A to 11D correspond to the reference methods a to d.

Figure 11A:
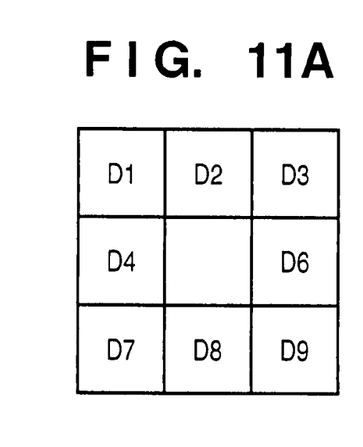
FIGS. 11A to 11D are views showing a concrete example of controlling a peripheral pixel reference method in accordance with a determination mode control signal DM in an edge determination circuit 1009.
Figure 11B:
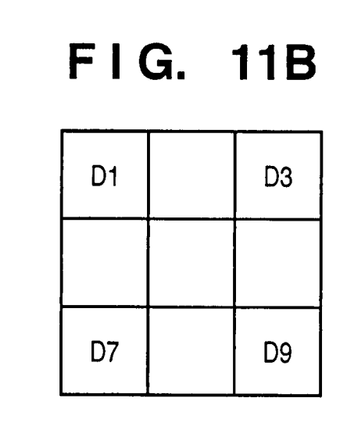
Figure 11C:
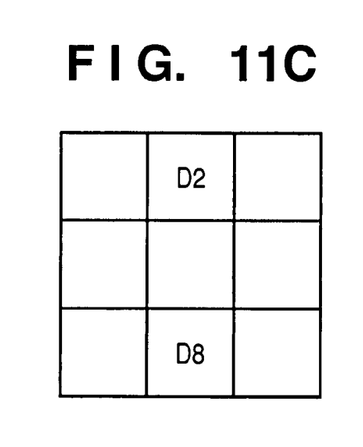
Figure 11D:
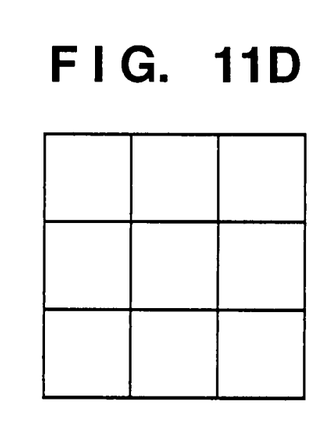

In FIG. 11A, similar to the peripheral pixel reference method in the first embodiment, all eight pixels adjacent to a pixel of interest are referred to, and when the detection signal DET becomes true for one of the pixels, defect detection of the pixel of interest is determined to be erroneous detection of an edge. In FIG. 11B, only four diagonally adjacent pixels (D1, D3, D7, and D9) are referred to, and when the detection result becomes true for one of the four pixels, the pixel of interest is determined to be an edge. In FIG. 11C, only two vertically adjacent pixels (D2 and D8) are referred to. In FIG. 1D, no adjacent pixel is referred to.

As described above, the edge determination circuit 902 determines whether defect detection for a pixel of interest is erroneous edge detection, by using a peripheral pixel reference method corresponding to the determination mode control signal DM supplied from the control CPU 901. The peripheral pixel reference methods are not limited to the above-described ones, and a desired reference method can be employed in accordance with the color filter array or the position of a pixel of interest in the image sensing element 102. When the number of generated defective pixels increases due to temperature rise of the image sensing element 102, long-time exposure, or the like, defective pixels are more likely to be distributed two-dimensionally successively. By decreasing the number of reference pixels, the defective pixel detection ability can improve. When, however, the number of peripheral pixels to be referred to is decreased, the image quality degrades at high probability due to erroneous edge detection. Thus, the control CPU 901 must output the determination mode control signal DM so as to set an appropriate reference method in accordance with the temperature or exposure time condition of the image sensing element 102.

Another embodiment which further improves the defect detection reliability will be described.

Although not shown in FIG. 1, position information of a defective pixel detected during image sensing is stored for several frames in a nonvolatile memory, register, or the like. If the defective pixel is detected at the same position in all frames (or a predetermined number of frames or more), position information of the defective pixel can be determined to be highly reliable position information. A detection signal (to be referred to as the second detection signal hereinafter) for a defective pixel which has been detected is output in accordance with the position information, and a defective pixel correction circuit 107 performs correction on the basis of the second detection signal. Alternatively, the defective pixel correction circuit 107 may perform correction only when the second detection signal and the determination signal DEF are compared and both of the signals are true. This can further prevent erroneous detection of a defective pixel. Position information of a defective pixel which is stored for several frames may be updated at an arbitrary timing. Position information of a defective pixel detected during image sensing can be obtained by measuring by a counter or the like a count from a change point of a timing reference signal (e.g., horizontal sync signal) to a change point of the determination signal DEF. The second detection signal based on position information can also be output from a circuit which becomes true when the count value of the counter and the count of position information coincide with each other.

The above-described embodiments have exemplified a single-CCD image sensing apparatus having only one image sensing element 102. However, the present invention is not limited to this, and can be applied to an image sensing apparatus having three (two or more) image sensing elements. The above-described embodiments have exemplified the image sensing element 102 having a color filter. However, the present invention is not limited to this, and can also be applied to an image sensing element for sensing a monochrome image without any color filter. As the image sensing element, a CMOS sensor or the like can also be utilized in addition to the above-mentioned CCD.

As has been described above, the image sensing apparatus and image sensing method according to the above embodiments can detect a defective pixel at high precision by preventing erroneous detection of a defective pixel even while sensing a complicated object.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   a first determination device which determines whether or not a pixel of interest subjected to defective pixel detection out of a plurality of pixels of an image sensing element is a defective pixel candidate;
   a second determination device which determines whether or not the pixel of interest is a defective pixel when the pixel of interest is determined as the defective pixel candidate by said first determination device; and
   a correction device which corrects the pixel of interest when the pixel of interest is determined as the defective pixel by said second determination device,
   wherein said first determination device determines that the pixel of interest is the defective pixel candidate when a difference between a signal level of the pixel of interest and signal levels of a plurality of neighboring pixels existing around the pixel of interest is larger than a predetermined threshold value, and
   wherein said second determination device refers to the neighboring pixels of the pixel of interest and determines that the pixel of interest is not the defective pixel in a case that a pixel, which is determined as the defective pixel candidate by said first determination device, exists in the neighboring pixels, and determines that the pixel of interest is the defective pixel in a case that a pixel, which is determined as the defective pixel candidate by said first determination device, does not exist in the neighboring pixels.

2. The apparatus according to claim 1, wherein said second determination device sets a combination of the neighboring pixels referred to by said second determination device.

3. The apparatus according to claim 2, wherein said second determination device sets the combination of the neighboring pixels to be referred to on the basis of an image sensing condition.

4. The apparatus according to claim 3, wherein the image sensing condition includes an ambient temperature of the image sensing element.

5. The apparatus according to claim 3, wherein the image sensing condition includes an exposure time in the image sensing element.

6. The apparatus according to claim 1, further comprising an image sensing lens which forms an image on the image sensing element, and an A/D converter which A/D-converts a signal from the image sensing element and transfers the signal to said detection device.

7. An image sensing method for an image sensing apparatus having an image sensing element with a plurality of pixels which output image sensing signals, comprising:
   a first determination step of determining whether or not a pixel of interest subjected to defective pixel detection out of the plurality of pixels of the image sensing element is a defective pixel candidate;
   a second determination step of determining whether or not the pixel of interest is a defective pixel when the pixel of interest is determined as the defective pixel candidate by said first determination step; and
   a correction step of correcting the pixel of interest when the pixel of interest is determined as the defective pixel by said second determination step,
   wherein said first determination step determines that the pixel of interest is the defective pixel candidate when a difference between a signal level of the pixel of interest and signal levels of a plurality of neighboring pixels existing around the pixel of interest is larger than a predetermined threshold value, and
   wherein said second determination step refers to the neighboring pixels of the pixel of interest and determines that the pixel of interest is not the defective pixel in a case that a pixel, which is determined as the defective pixel candidate by said first determination step, exists in the neighboring pixels, and determines that the pixel of interest is the defective pixel in a case that a pixel, which is determined as the defective pixel candidate by said first determination step, does not exist in the neighboring pixels.

* * * * *